US008479152B2

(12) United States Patent
Ciano et al.

(10) Patent No.: US 8,479,152 B2
(45) Date of Patent: Jul. 2, 2013

(54) REPRESENTING NON-FUNCTIONAL REQUIREMENTS (NFRS) IN UNIFIED MODELING LANGUAGE (UML)

(75) Inventors: Giuseppe Ciano, Rome (IT); Scot MacLellan, Rome (IT); Antonio Perrone, Rome (IT)

(73) Assignee: International Business Machines Corporation, Armonk, NY (US)

( * ) Notice: Subject to any disclaimer, the term of this patent is extended or adjusted under 35 U.S.C. 154(b) by 210 days.

(21) Appl. No.: 12/910,378

(22) Filed: Oct. 22, 2010

(65) Prior Publication Data

US 2011/0113402 A1    May 12, 2011

(30) Foreign Application Priority Data

Nov. 12, 2009   (EP) .................................... 09175788

(51) Int. Cl.
   *G06F 9/44*            (2006.01)
(52) U.S. Cl.
   USPC .......................................... 717/104; 717/105
(58) Field of Classification Search
   None
   See application file for complete search history.

(56) References Cited

U.S. PATENT DOCUMENTS

| | | | |
|---|---|---|---|
| 8,161,459 B2 * | 4/2012 | Gorthi et al. | 717/124 |
| 8,209,657 B1 * | 6/2012 | Sawyer et al. | 717/100 |
| 2009/0132211 A1 * | 5/2009 | Lane et al. | 703/2 |
| 2009/0138293 A1 * | 5/2009 | Lane et al. | 705/7 |
| 2009/0178102 A1 * | 7/2009 | Alghathbar et al. | 726/1 |
| 2011/0004565 A1 * | 1/2011 | Stephenson et al. | 705/348 |

OTHER PUBLICATIONS

Using UML to Reflect Non-Functional Requirements by Luiz Marcio Cysneiros, ACM, 2001, CASCON '01 Proceedings of the 2001 conference of the Centre for Advanced Studies on Collaborative research, p. 2 line 7-17.*

Cysneiros, Luis Marcio, et al., "Using UML to Reflect Non-Functional Requirements" (15 pages). Proceeding CASCON '01 Proceedings of the 2001 conference of the Centre for Advanced Studies on Collaborative research.

Donatelli, Alex, et al., "Unified Scenario-Based Design, Part 1: Methodological principles", Internet-published article printed Sep. 27, 2010 from http://www.ibm.com/developerworks/rational/library/05/1129_donatelli/ (13 pages).

Donatelli, Alex, et al., "Unified Scenario-Based Design, Part 2: Understanding the customer and the user", Internet-published article printed Sep. 27, 2010 from http://www.ibm.com/developerworks/rational/library/06/1214_donatelli/ (19 pages).

Donatelli, Alex, et al., "Unified Scenario-Based Design, Part 3: Conceptual design", Internet-published article printed Sep. 27, 2010 from http://www.ibm.com/developerworks/rational/library/06/0404_donatelli/ (14 pages).

* cited by examiner

*Primary Examiner* — Isaac Tecklu
*Assistant Examiner* — Hossain Morshed
(74) *Attorney, Agent, or Firm* — Marcia L. Doubet

(57) ABSTRACT

Modeling non-functional requirements (NFRs) in a computer programming environment. In one aspect, this further comprises: identifying use case (UC) artifacts having one or more NFRs; retrieving the one or more NFRs and any data associated therewith; analysing the associated data to define a test case therefor; retrieving a UC realization from a model to determine one or more possible program flows; and testing each possible program flow to select the test case which verifies the use case required, thereby modeling the NFR.

11 Claims, 6 Drawing Sheets

REPRESENTING NON-FUNCTIONAL REQUIREMENTS (NFRS) IN UNIFIED MODELING LANGUAGE (UML)

CROSS REFERENCE TO RELATED APPLICATION

This application claims priority of European Patent Application Serial No. 09175788.0 entitled "A Method and System for Representing Non-Functional Requirements (NFRs) in Unified Modeling Language (UML)", filed on Nov. 12, 2009.

BACKGROUND

The present invention relates to representing non-functional requirements (NFRs) in unified modeling language (UML).

It is known to define and capture product requirements by deriving them directly from business process modeling. The methodology to carry this out provides a formal framework for UML-based model-driven design that ensures that the requirements are reflected in every level of the design through formal model artifact tracing.

BRIEF SUMMARY

The present invention is directed to modeling non-functional requirements (NFRs) in a computer programming environment. In one aspect, this comprises: identifying use case (UC) artifacts having one or more NFRs; retrieving the one or more NFRs and any data associated therewith; analysing the any associated data to define a test case therefor; retrieving a UC realisation from a model to determine one or more possible program flows; and testing each possible program flow to select the test case which verifies the use case required, thereby modeling the NFR.

In another aspect, the present invention provides a system for modeling NFRs in a computer programming environment, the system comprising a modeling tool for modeling NFRs of the relevant program; a basic engine for operating system elements; a repository of models; and a repository of NFRs, wherein a UC realisation is determined from the repository of models, the UC realisation including one or more program flows; and wherein a test case for each NFR is used to verify an optical flow for a particular NFR.

BRIEF DESCRIPTION OF THE SEVERAL VIEWS OF THE DRAWINGS

Reference will now be made, by way of example, to the accompanying drawings, in which.

DETAILED DESCRIPTION

Figure 1:
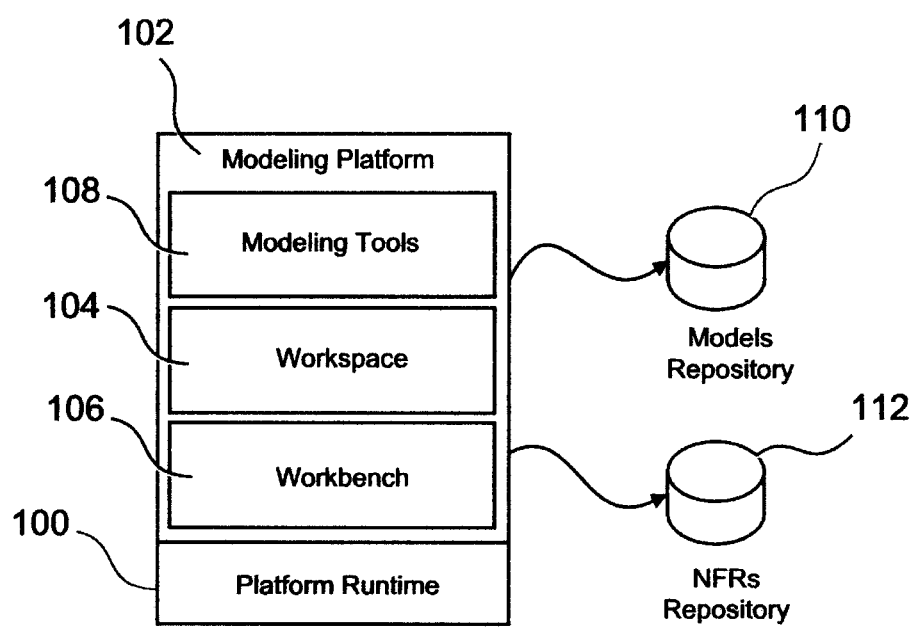
FIG. 1 is a block diagram of a system, according to an embodiment of the invention, by way of example.

The present invention is directed to representing Non-Functional Requirements (NFRs) with UML modeling. Representing Non-Functional Requirements in a model, as disclosed herein, enables tracing these requirements through each level of design to ensure that the requirements are respected even at the lowest level of design. The non-functional requirements and functional requirements may therefore be unified in terms of modeling and tools to capture and describe them.

Given the benefits achieved by UML-based model-driven design with regard to functional requirements, an embodiment of the present invention seeks to tackle the issue of formally representing Non-Functional Requirements (NFRs) in a model. In addition, an embodiment of the present invention traces these requirements through each level of the design to ensure that they are respected even at the lowest level of design.

Examples of NFRs include consumability requirements, scalability requirements, and performance requirements. The appropriate handling of NFRs enables efficient production of quality software. Errors introduced by not considering NFRs can be very expensive and difficult to correct. In fact, imperfect handling of NFRs can lead to significantly more expensive software and a longer "time-to-market".

Using UML is a natural choice for describing the functional behavior of a system, but it is not a natural choice for describing the non-functional aspects as there are currently no UML artifacts to capture and describe NFRs.

A publication titled "Using UML to Reflect Non-Functional Requirements" by Cysneiros et al. (hereinafter, "Cysneiros") discloses the use of a UML profile for modeling NFRs. However this does not solve the problem. Cysneiros does not describe a system for managing NFRs based on a UML profile. Cysneiros fails to disclose how to apply a UML profile to a UML artifact while defining a compatible methodology for all the possible UML artifacts. Also, Cysneiros does not describe any UML model validation process based on NFRs description.

"Unified Scenario-Based Design, Part 1: Methodological principles" by Donatelli et al., "Unified Scenario-Based Design, Part 2: Understanding the customer and the user" by Donatelli et al., and "Unified Scenario-Based Design, Part 3: Conceptual design" by Donatelli et al. all describe a methodology that was devised and deployed to improve the definition and capture of product requirements by deriving them directly from business process modeling. The methodology also provides a formal framework for UML-based, model-driven design which ensures that the design requirements are reflected in every level of the design through formal model artifact tracing. This methodology does not capture and describe NFRs.

An approach adopted herein to represent NFRs in UML format is based on a new UML profile, called the NFR UML profile, that supports and describes Non-Functional Requirements. By using this approach, the scope of an existing model-driven design approach is extended to NFRs.

The proposed approach can help to solve the problems of the prior art by assisting the developer in realising software systems and in making decisions that are compatible with a set of NFRs described through an appropriate profiling of the UML. The approach relies on a particular sequencing and usage of the UML API, and will perform a model validation based on UML profiles, Constraints, and Patterns being applied to the UML artifacts.

An embodiment of the present invention will provide information on possible inconsistencies between the NFRs defined to the UML artifacts and the constraints and patterns assigned to the implementation classes. The inconsistency detection will be based on an NFRs knowledge library that will contain mappings between UML profiles and patterns/constraints that should be avoided.

Referring to FIG. 1, a method and system to model and manage NFRs is described. This relies on the usage of a customization/profile that will be applied to the modeling artifacts and on a system that allows the management of NFRs. The system depicted in FIG. 1 includes the following elements:

- a Platform Runtime (100). This comprises a base engine that operates the system elements, for example plug-ins which provide architecture and functional content and any other appropriate function;
- a modeling platform (102) which is built on the Platform Runtime and provides a base for the Workbench (106). This is a viable integration platform for tools and/or applications and includes a workspace 104, a workbench 106, and modeling tools 108.

The Workspace 104 is a resource model with support for projects/folders/files, as well as natures, builders, and markers. The Workbench 106 includes layers in the user interface (UI) domain that build on each other and model an integrated UI with Views and Editors in different perspectives. The modeling tools 108 are a set of tools used for design and development. In addition, the system includes two external repositories that store models (110) and NFRs (112).

In order to implement the system, certain NFR-Modeling extensions should be included in the definition of a profile that describes the NFRs and a view and perspective for these NFRs.

An extension is based on stereotypes, tagged values, and constraints. Stereotypes give roles to elements and assist in identification of the NFR. Tagged Values provide role-specific information which enriches the element and its role and describes the NFR in a formal way. Constraints provide a way of specifying rules for the correct usage of the stereotyped elements.

Certain stereotypes define abstract NFR classes, such as Performance, Scalability, Consumability, and so on, and some stereotypes describe real NFR classes such as ResponseTime or EvaluationSetup. A set of tagged values models the NFR and extracts from the NFR some key characteristics along with its identification and description. A set of constraints is used to prevent inconsistency between different NFRs.

Figure 2:
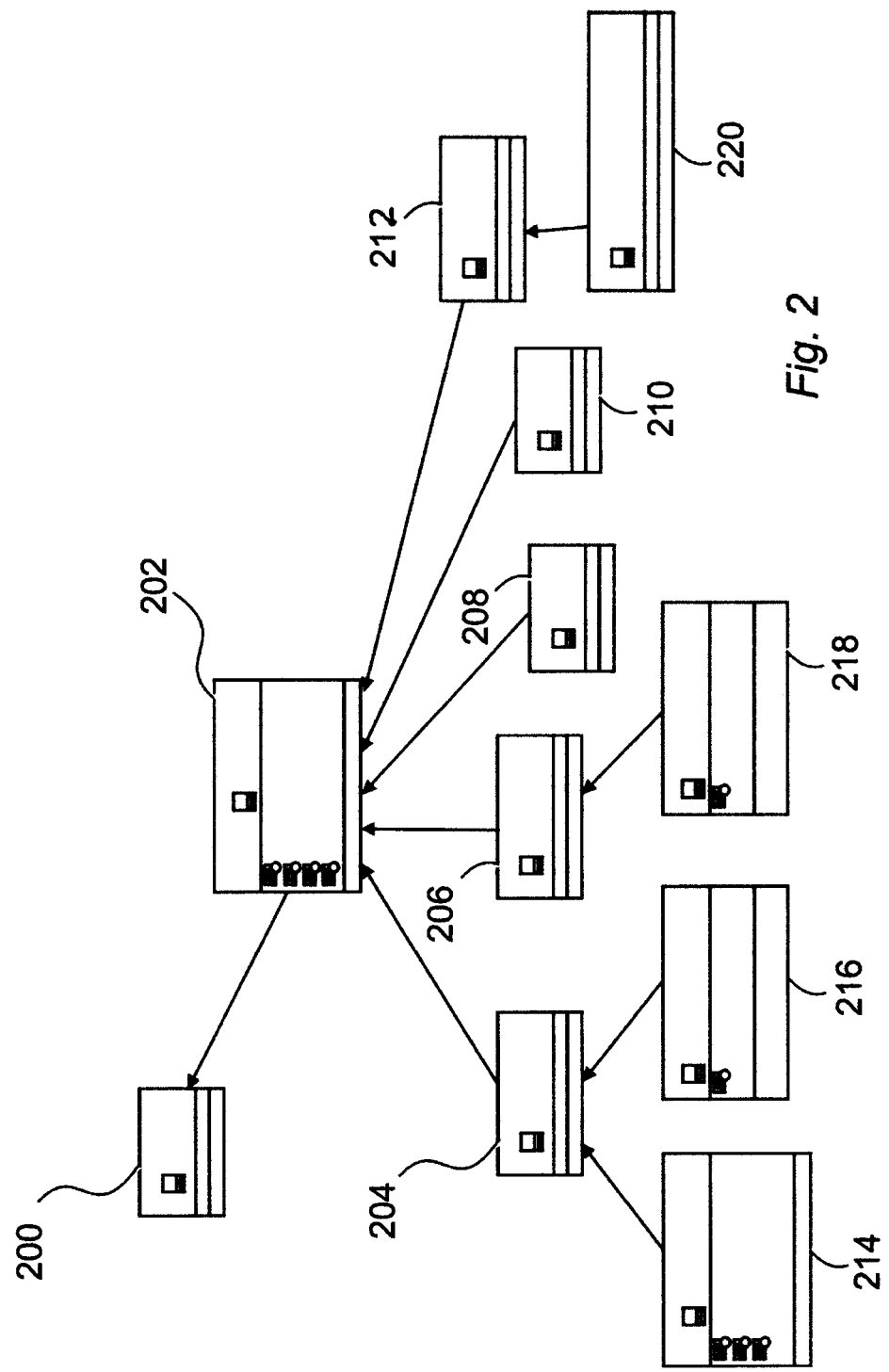
FIG. 2 is a block diagram showing the NFRs definitions and relationships, according to an embodiment of the invention, by way of example.

FIG. 2 describes a sample of a profile, based on UML profile, with certain NFR stereotypes and tagged values defined.

A metaclass artifact 200 is extended to give rise to a stereotype NFR 202. This includes, for example, stereotypes for Consumability 204, Performance 206, Usability 208, Reliability 210, and Supportability 212. Further subsets of Consumability 204 include EvaluationSetup 214 and ChangeMyConfiguration 216, while Performance 206 includes ResponseTime 218 and Supportability 212 includes Scalability 220. It will be appreciated that other stereotypes may be used in different situations.

Figure 3:
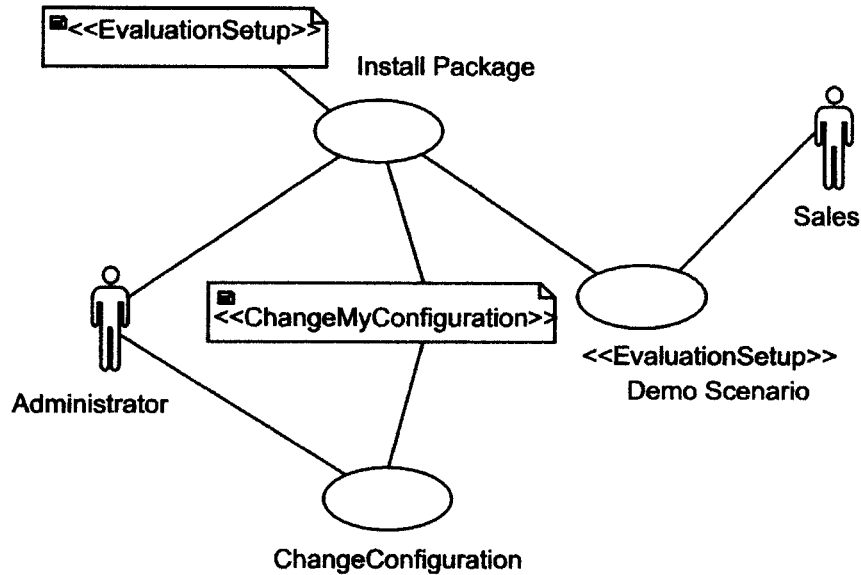
FIG. 3 is a use case diagram for demonstrating operation of a system, according to an embodiment of the invention, by way of example.

FIG. 3 shows how the modeling phase can make use of the UML profile to augment the UML models with NFR information. In this example, the basic use case model has been augmented with NFR information, such as EvaluationSetup and ChangeMyConfiguration. These have been added to a basic use case diagram. In addition, if support of an NFR adds a new Use Case which has not been previously identified working with the Functional Requirement, the new Use Case will be classified with the correct NFR stereotype.

A further step after the validation is to ensure that all the NFRs are used in the following activities, as will now be described. For NFRs that are expressed through the addition of an entire Use Case, this is straightforward as the USE CASE realisation is a direct use of the NFR. NFRs that are expressed through the addition of special annotation need to have at least a test case that refers to them. This ensures that the NFR information was managed properly, and not mislaid during the analysis and implementation.

The NFRs can be expressed in two different ways in the system. A first approach is through the usage of particular NFR stereotyped UML comments attached to UML artifacts (for example Use Cases) derived from Functional Requirements to constrain/modify their behavior artifacts. A given NFR stereotyped UML comment has a unique identifier and can be attached to multiple UML artifacts. This makes it possible to express a particular NFR in a single place and reference it in all the places where it applies. This is shown in the ChangeMyConfiguration NFR applied to the UCs InstallPackage and ChangeConfiguration of FIG. 3.

Alternatively, in a second approach, the support of an NFR can define a new UC to be supported and in this case, it is classified with the correct NFR stereotype. The NFR requires the addition of an entire functionality instead of modifying the behavior of a more basic functionality. These UCs can be removed if the NFR is no longer required or is out of the scope of the software release. The NFR stereotyped UCs may be extracted from libraries of the UC, as they tend to capture consolidated requirements of a development organization among several projects or functions.

For each applied stereotype, the tagged values will describe further details relating to the NFR, which is linked to the UML artifacts. Additional extensions may be provided to add a view of the workspace in order to manage and navigate the NFRs through the artifact models in an effective manner. For example, a list of all the UCs linked to specific NFRs (or a subset of them) can be generated. In this way, it is possible to understand which UCs are affected by NFR changes. In an alternative case, a list of all the NFRs related to a specific UC (or a subset of UCs) can be generated. In this way, it is possible to detect the NFRs which no longer satisfy removal of a UC. Finally, a list of all the UCs affected by a category of NFRs (for example, Performance) can also be generated.

Figure 4:
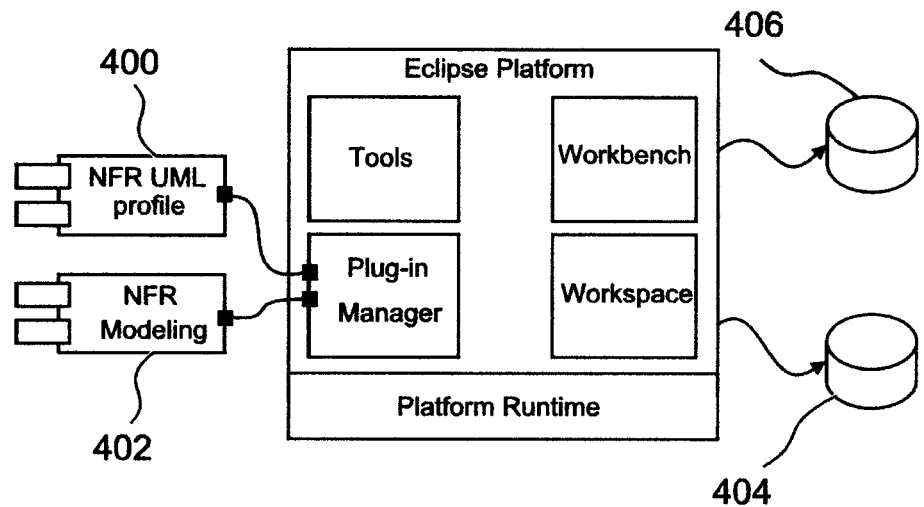
FIG. 4 is an example of a system using an Eclipse platform, according to an embodiment of the invention, by way of example.

FIG. 4 shows an overview of a proposed implementation using an Eclipse platform based on Eclipse plug-ins. The elements that will be added and/or customized include an NFR UML profile plug-in 400, an NFR modeling plug-in 402, an NFRs repository 404, and a UML model repository 406.

The NFR UML profile plug-in 400 contains the description of the UML profile for the NFRs. The NFR Modeling plug-in 402 contains NFR views and customization for the Eclipse workspace and workbench. The NFR external repository 404 is used to keep track of the NFRs. The UML model repository 406 is used to keep a record of UML models.

Figure 5A:
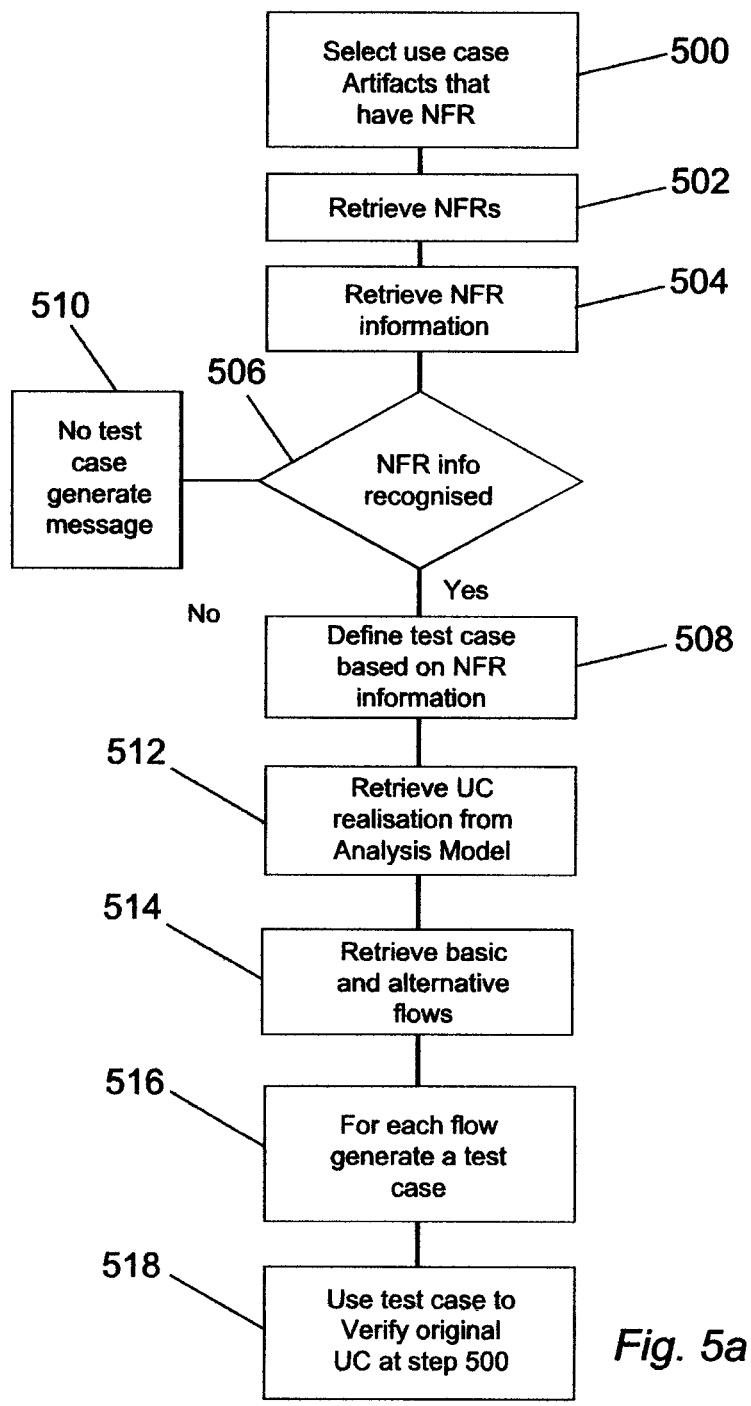
FIGS. 5a and 5b are flowcharts of a test case from the system, according to an embodiment of the invention, by way of example.

Test Cases may be generated based on the proposed UML Profile. One way to exploit the NFR modeling described in FIG. 3 is to define a way of automatically creating test cases and validating the test case coverage of the NFRs. The test cases can be used during a test phase to verify that the UCs support the NFRs. This may be carried out as follows, with reference to the flowchart of FIG. 5a.

The first step 500 selects all the Use Case (UC) artifacts that have one or more NFRs applied to them. At step 502, for each Use Case retrieved in step 500, all the NFRs are retrieved. In step 504, for each NFR retrieved at step 502, all the information about the NFR (e.g., tagged values, constraints, etc.) are retrieved. Based on the NFR stereotype information retrieved at step 504, a query is performed to an external NFR testing knowledge library (step 506) to retrieve additional information on how to define a test case based on the tagged values/constraints information which was retrieved at step 504. If yes, a test case is defined at 508. If no, a message will be generated at 510 to state that it is not possible to generate a test case for this NFR.

At step 512, for all the UCs selected at step 500, a related Use Case Realization in an Analysis Model is retrieved. Then at step 514, the Use Case Realization list of flows (e.g., basic and alternative flows) is retrieved. For each flow retrieved at step 514, and based on the NFR tagged values retrieved at 504 and the additional information retrieved from NFR testing knowledge library at 506, a Test Case can be generated (step 516). This process can be automatic or guided by user interactions. In step 518, the test case generated will be used to verify that the UC of step 500 satisfies the NFR of step 502.

Figure 5B:
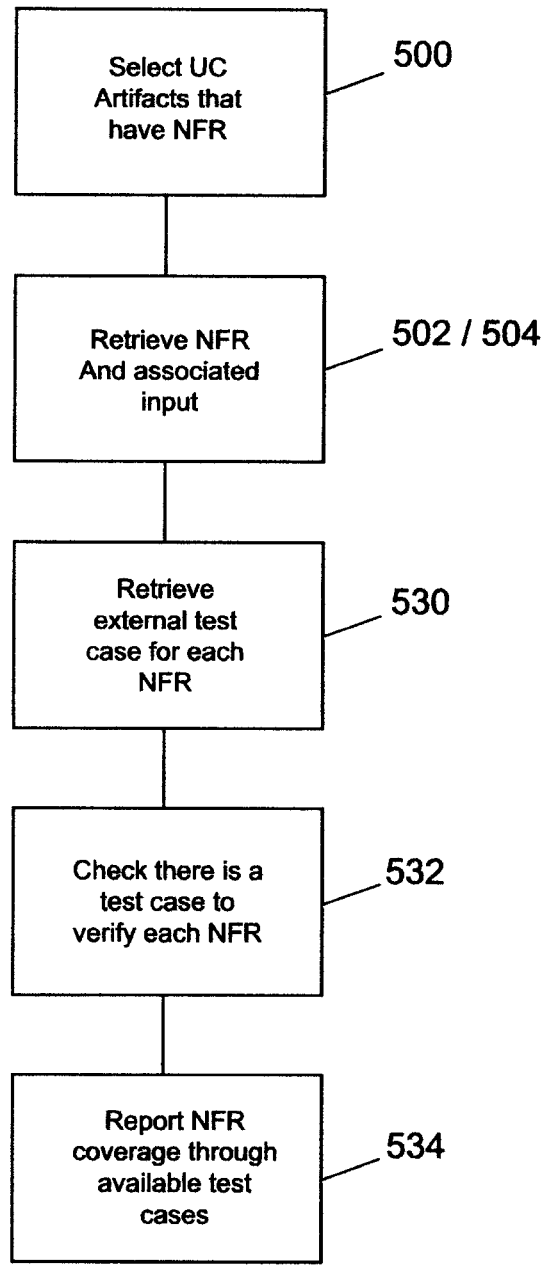

FIG. 5b shows an example of Validating Test Case Coverage. As discussed earlier with reference to FIG. 5a, use cases with NFR artifacts are determined (500) and the NFRs applied to it are retrieved for each use case (502), and for each NFR retrieved at 502, all the information about the NFR (e.g., tagged values, constraints) is also retrieved (504).

A query is carried out to an external NFR test case library to retrieve the test cases generated for each specific NFR (step 530). Then at step 532, a check is made to ensure there is at least one test case to verify an NFR and notify if there is no coverage for this NFR. Finally, at step 534, a report of NFR coverage through the test cases available in the NFR test case repository is made.

Figure 6:
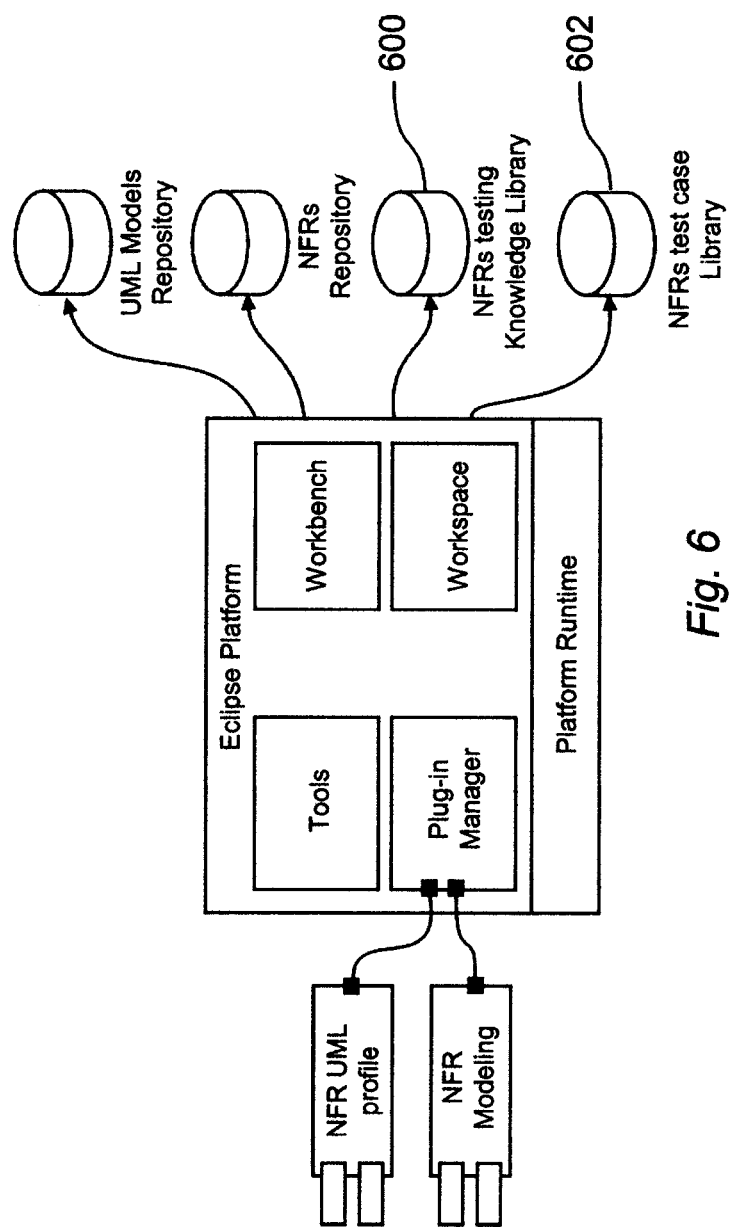
FIG. 6 is a full representation for a system, according to an embodiment of the invention, by way of example.

In order to generate the test cases relating to the NFR (as discussed with reference to 516 of FIG. 5a), two external repositories, an NFR testing knowledge library 600 and an NFR test cases repository 602, are added to the system, as illustrated in FIG. 6.

The NFR testing knowledge library 600 will contain the following:
- test case templates that will include information retrieved from the NFR profile (e.g., tagged values, constraints, etc.);
- information that will be used to decide if a test case has to be generated for all the flows or just for the main flow;
- information that may be used to assign a priority to the test cases based on the NFR; and
- information that will be used to assign a cost (in terms of points) to the test cases based on the NFR.

The NFR test case library 602 will contain generated test cases based on the NFRs and any relevant links between the test cases and the NFRs.

This approach may be used if an NFR requirement is deferred from a current development release, as it is possible to invoke the test case generation and the validation process again. This means it is possible to maintain the list of NFRs to be supported, and the test cases used to verify them, in synchronisation with one another.

It will be appreciated that there are many variations which could be applied to the above-described method and system.

Each hardware function could be carried out by an appropriate software module and each software function could be carried out by an appropriate functional module. The system and method could thus be implemented fully in software, fully in hardware, or in a combination thereof. Furthermore, the present invention may take the form of a computer program product embodied in any tangible medium having computer-usable program code embodied in the medium. Any combination of one or more computer usable or computer readable media may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, or a magnetic storage device. In the context of this document, a computer-usable or computer-readable medium may be any tangible medium that can contain or store the program for use by or in connection with the instruction execution system, apparatus, or device.

Computer program code for carrying out operations of the present invention may be written in any combination of one or more programming languages, including an object oriented programming language such as Java®, Smalltalk, C++ or the like and conventional procedural programming languages, such as the "C" programming language or similar programming languages. ("Java" is a registered trademark of Sun Microsystems, Inc. in the United States, other countries, or both.) The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The invention claimed is:

1. A method of modeling non-functional requirements (NFRs) in a computer programming environment, comprising:
   identifying each of a plurality of use case (UC) artifacts that each have one or more NFRs applied thereto;
   for each of the identified UC artifacts, retrieving the one or more NFRs applied thereto, and for each retrieved NFR, any data associated therewith, the associated data comprising at least a stereotype for the NFR;
   for each of the retrieved NFRs, using the associated stereotype to access an NFR testing knowledge library to determine whether the NFR has test case definition information stored therein, the test case definition information specifying how to define a test case for the NFR;
   for each of the identified UC artifacts, retrieving a corresponding UC realisation from a model repository to determine one or more possible program flows identified for the corresponding UC realisation;
   responsive to determining that any of the retrieved NFRs has test case definition information stored in the NFR testing knowledge library, using the stored test case definition information, along with the one or more possible program flows determined from the UC realisation that corresponds to the identified UC artifact to which the retrieved NFR is applied, to generate a test case for at least one of the one or more possible program flows; and
   for each of the identified UC artifacts, testing each of the generated test cases to verify that the UC artifact satisfies the one or more NFRs applied to the UC artifact, thereby modeling the NFRs in the computer programming environment.

2. The method of claim 1, further comprising representing the NFRs in a unified modeling language format.

3. The method of claim 1, wherein:
   the NFR testing knowledge library contains mappings for the NFRs, each mapping comprising an identification of a particular one of the NFRs and any associated program flow which should be avoided for the particular NFR; and
   the using the stored test case definition information, along with the one or more possible program flows determined from the UC realisation that corresponds to the identified UC artifact to which the retrieved NFR is applied, to generate a test case for at least one of the one or more possible program flows omits each program flow identified in the mapping for the particular NFR.

4. The method of claim 1, further comprising defining an NFR modeling extension to describe the NFRs.

5. The method of claim 4, further comprising defining the NFR modeling extension based on at least one of: stereotypes, tagged values, patterns, and constraints of the NFR.

6. The method of claim 1, further comprising validating each of the NFRs to ensure that appropriate test case coverage of the NFR has been defined.

7. The method of claim 6, wherein the validating further comprises:
   determining each of the plurality of UC artifacts that each have one or more NFRs applied thereto;
   for each of the determined UC artifacts, determining the one or more NFRs applied thereto, and for each determined NFR, any data associated therewith, the associated data comprising at least a stereotype for the NFR;
   for each of the determined NFRs, using the associated stereotype to access an NFR test case library to retrieve each of at least one test case stored therein for the NFR; and
   for any of the determined NFRs for which no test case is stored in the NFR test case library, generating a no-coverage notification for the NFR, and for remaining ones of the determined NFRs, generating a report of coverage by the retrieved at least one test case for the NFR.

8. The method according to claim 1, wherein the test case definition information stored in the NFR testing knowledge library specifies, for each of the retrieved NFRs, whether the using the stored test case definition information, along with the one or more possible program flows determined from the UC realisation that corresponds to the identified UC artifact to which the retrieved NFR is applied, to generate a test case for at least one of the one or more possible program flows will generate a test case for each of one or more possible program flows.

9. The method according to claim 1, wherein:
   at least one of the applied NFRs is defined using a stereotyped modeling language comment, the definition having associated therewith a unique identifier that facilitates reuse of the definition among multiple ones of the UC artifacts.

10. A computer program executable on a programmable apparatus for modeling non-functional requirements (NFRs) in a computer programming environment, the computer program stored on non-transitory computer-readable storage media and comprising computer-readable instructions which, when executed by the programmable apparatus, cause the programmable apparatus to perform:
    identifying each of a plurality of use case (UC) artifacts that each have one or more NFRs applied thereto;
    for each of the identified UC artifacts, retrieving the one or more NFRs applied thereto, and for each retrieved NFR, any data associated therewith, the associated data comprising at least a stereotype for the NFR;
    for each of the retrieved NFRs, using the associated stereotype to access an NFR testing knowledge library to determine whether the NFR has test case definition information stored therein, the test case definition information specifying how to define a test case for the NFR;
    for each of the identified UC artifacts, retrieving a corresponding UC realisation from a model repository to determine one or more possible program flows identified for the corresponding UC realisation;
    responsive to determining that any of the retrieved NFRs has test case definition information stored in the NFR testing knowledge library, using the stored test case definition information, along with the one or more possible program flows determined from the UC realisation that corresponds to the identified UC artifact to which the retrieved NFR is applied, to generate a test case for at least one of the one or more possible program flows; and
    for each of the identified UC artifacts, testing each of the generated test cases to verify that the UC artifact satisfies the one or more NFRs applied to the UC artifact, thereby modeling the NFRs in the computer programming environment.

11. A system for modeling non-functional requirements (NFRs) in a computer programming environment, the system comprising:
    a computer comprising a processor; and instructions which are executable, using the processor, to implement functions comprising:

identifying each of a plurality of use case (UC) artifacts that each have one or more NFRs applied thereto;

for each of the identified UC artifacts, retrieving the one or more NFRs applied thereto, and for each retrieved NFR, any data associated therewith, the associated data comprising at least a stereotype for the NFR;

for each of the retrieved NFRs, using the associated stereotype to access an NFR testing knowledge library to determine whether the NFR has test case definition information stored therein, the test case definition information specifying how to define a test case for the NFR;

for each of the identified UC artifacts, retrieving a corresponding UC realisation from a model repository to determine one or more possible program flows identified for the corresponding UC realisation;

responsive to determining that any of the retrieved NFRs has test case definition information stored in the NFR testing knowledge library, using the stored test case definition information, along with the one or more possible program flows determined from the UC realisation that corresponds to the identified UC artifact to which the retrieved NFR is applied, to generate a test case for at least one of the one or more possible program flows; and for each of the identified UC artifacts, testing each of the generated test cases to verify that the UC artifact satisfies the one or more NFRs applied to the UC artifact, thereby modeling the NFRs in the computer programming environment.

* * * * *